United States Patent
Cheruel

(10) Patent No.: US 8,466,973 B2
(45) Date of Patent: Jun. 18, 2013

(54) COMPUTER DEVICE AND METHOD FOR ADAPTING THE COMPRESSION RATE OF DIGITAL IMAGES

(75) Inventor: Fabrice Cheruel, Mulsanne (FR)

(73) Assignee: ST-Ericsson SA, Geneva (CH)

( * ) Notice: Subject to any disclaimer, the term of this patent is extended or adjusted under 35 U.S.C. 154(b) by 417 days.

(21) Appl. No.: 12/523,861

(22) PCT Filed: Jan. 15, 2008

(86) PCT No.: PCT/IB2008/050125
§ 371 (c)(1),
(2), (4) Date: Jan. 14, 2010

(87) PCT Pub. No.: WO2008/090487
PCT Pub. Date: Jul. 31, 2008

(65) Prior Publication Data
US 2010/0134636 A1      Jun. 3, 2010

(30) Foreign Application Priority Data

Jan. 22, 2007   (EP) ..................................... 07290098

(51) Int. Cl.
*H04N 5/232* (2006.01)
*H04N 5/76* (2006.01)
(52) U.S. Cl.
USPC .................................... 348/211.5; 348/231.6
(58) Field of Classification Search
USPC ............ 348/211.1, 231.1; 375/240; 370/468, 370/477
See application file for complete search history.

(56) References Cited

U.S. PATENT DOCUMENTS

| | | | |
|---|---|---|---|
| 5,784,569 A | 7/1998 | Miller et al. | |
| 6,697,902 B1 * | 2/2004 | Sugimoto | 710/305 |
| 6,754,267 B1 | 6/2004 | Shimanaka | |
| 2002/0054212 A1 * | 5/2002 | Fukuoka | 348/207 |
| 2002/0065043 A1 * | 5/2002 | Hamada | 455/41 |
| 2004/0190488 A1 * | 9/2004 | Bokish et al. | 370/351 |
| 2004/0218080 A1 * | 11/2004 | Stavely et al. | 348/333.11 |
| 2004/0223184 A1 | 11/2004 | Kusumoto et al. | |
| 2005/0134907 A1 * | 6/2005 | Obuchi et al. | 358/1.15 |
| 2005/0210515 A1 * | 9/2005 | Roh et al. | 725/81 |
| 2005/0254519 A1 | 11/2005 | Beukema et al. | |
| 2006/0153291 A1 | 7/2006 | Christison | |
| 2006/0161752 A1 * | 7/2006 | Burkey | 711/170 |
| 2006/0184987 A1 | 8/2006 | Allen et al. | |
| 2009/0073987 A1 * | 3/2009 | Li et al. | 370/395.31 |

OTHER PUBLICATIONS

PCT International Search Report, PCT/IB2008/050125, mailing date Jan. 4, 2008.

* cited by examiner

*Primary Examiner* — Lin Ye
*Assistant Examiner* — Euel Cowan
(74) *Attorney, Agent, or Firm* — William J. Kubida; Peter J. Meza; Hogan Lovells US LLP

(57) ABSTRACT

A computer device for a digital picture taking application includes a camera having an optical system, an electronic image sensor providing raw image data, and an image data compressor, a display, a computing subsystem and a data bus interfacing the computing subsystem with the image data compressor. The image data compressor generates a compressed picture data stream from the raw image data using a variable and externally controllable compression rate. A CPU and bus bandwidth manager monitors the available CPU utilization and bus bandwidth depending on activities of the computer program applications and allocates bus bandwidth to active computer program applications.

10 Claims, 1 Drawing Sheet

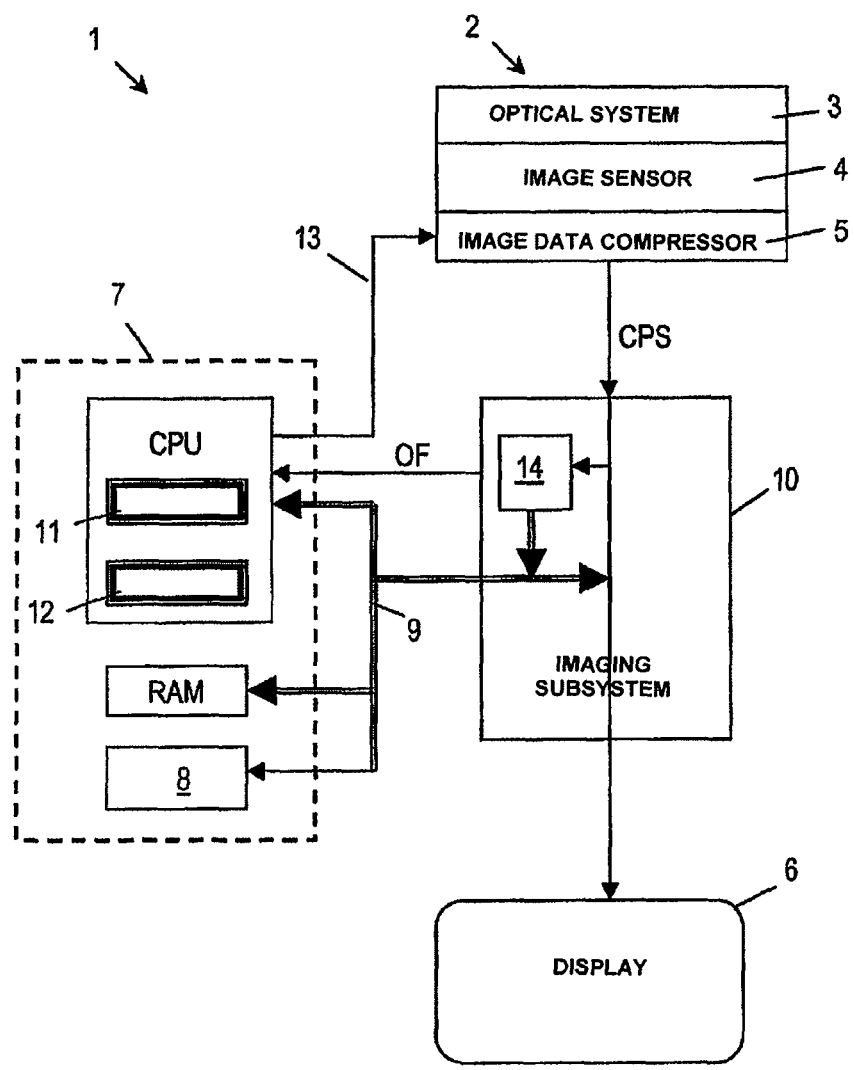

COMPUTER DEVICE AND METHOD FOR ADAPTING THE COMPRESSION RATE OF DIGITAL IMAGES

CROSS-REFERENCE TO RELATED APPLICATIONS

The present application is a national filing in the U.S. Patent & Trademark Office of PCT/IB2008/050125 filed Jan. 15, 2008, and claims priority of European Patent Application No. 07290098.8 filed Jan. 22, 2007, both of which applications are incorporated herein in their entireties by this reference.

FIELD OF THE INVENTION

The invention relates to a computer device being adapted to execute multiple time critical computer program applications in parallel, wherein one of said program applications is a digital picture taking application.

The invention further relates to a method for controlling a digital picture taking application in a computer device being adapted to execute multiple time critical computer program applications in parallel, wherein one of said program applications is the digital picture taking application.

The invention further relates to a computer program product directly loadable into the memory of a computer device, comprising software code portions for performing the steps of a method according to the second paragraph when said product is run on the device. The invention further relates to a computer device being adapted to process the computer program product mentioned in the above paragraph.

BACKGROUND OF THE INVENTION

The present invention copies with the problem of insufficient CPU performance and or bus bandwidth in computer devices, particularly when based on single core platforms, wherein multiple time critical applications have to be executed in parallel, one of these applications being a digital picture taking application. A computer device that is typically prone to said problem is e.g. a low or mid-end cellular phone, in which a cellular telecom stack and a still picture application are executed.

Document EP 1 691 272 A2 discloses an intelligent DMA in a mobile multimedia processor supporting multiple display formats. Methods and systems for processing video data are disclosed herein and include determining a first video format associated with video data to be displayed on a first video display communicatively coupled to a single mobile multiple media processor that supports a plurality of display formats. The single mobile multiple media processor may be integrated within a mobile device. An amount of the video data that is transferred from memory to the first video display, by a DMA controller, may be restricted based on the determined first video format associated with the video data to be displayed on a first video display. Only the restricted amount of the video data that is to be displayed by the first video display may be transferred from the memory to the first video display by the DMA controller.

The known method and device, however, do not take into consideration that the required bus bandwidth does not only depend on the video data transmitted from a memory to the first video display, but also depends on other applications running on the same device, resulting in a non-predictable available bandwidth for the video application. Hence, in the known device the video data either have to be restricted to such an amount that even in worst-case scenarios there is enough head room provided for transmitting the video data, or the transmission may fail.

OBJECT AND SUMMARY OF THE INVENTION

It is an object of the invention to provide a computer device of the type defined in the opening paragraph and a method of the type defined in the second paragraph, in which the disadvantages defined above are avoided.

In order to achieve the object defined above, with a computer device according to the invention characteristic features are provided so that a computer device according to the invention can be characterized in the way defined below, that is:

A computer device being adapted to execute multiple time critical computer program applications in parallel, wherein one of said program applications is a digital picture taking application, the computer device comprising:

a camera comprising an optical system, at least one electronic image sensor providing raw image data from the optical information received from the optical system and image data compressing means being adapted to compress the raw image data provided by the electronic image sensor into a compressed picture data stream, like a JPEG stream, a display, being adapted to display pictures taken by means of the camera, a computing sub-system for executing computer program applications comprising a central processing unit, a random access memory and at least one non-volatile memory, like an EPROM, and EEPROM and/or a FLASH memory, a data bus interfacing the computing sub-system with the image data compressing means, wherein the image data compressing meansare configured to generate the compressed picture data stream with a variable and externally controllable compression rate, wherein the computer device further comprises a CPU and bus bandwidth manager being adapted to monitor the available CPU utilisation and bus bandwidth in dependence on the activities of the computer program applications and to allocate bus bandwidth to active computer program applications, and imaging control means being adapted to control the compression rate of the image data compressing means in dependence on the available bus bandwidth.

In order to achieve the object defined above, with a method according to the invention characteristic features are provided so that a method according to the invention can be characterized in the way defined below, that is:

A method for controlling a digital picture taking application in a computer device being adapted to execute multiple time critical computer program applications in parallel, wherein one of said program applications is the digital picture taking application, the computer device comprising a camera with an optical system, at least one electronic image sensor providing raw image data from the optical information received by the optical system and image data compressing means being adapted to compress, with a variable and externally controllable compression rate, the raw image data provided by the electronic image sensor into a compressed picture data stream, like a JPEG stream, a display, a computing sub-system for executing computer program applications comprising a central processing unit, a random access memory (RAM) and at least one non-volatile memory, like an EPROM, and EEPROM and/or a FLASH memory, a data bus interfacing the computing sub-system with the image data compressing means, wherein the method comprises the steps of monitoring the available CPU utilisation and bus bandwidth in dependence on the activities of the computer program applications and to allocate bus bandwidth to active computer program applications, and to control the compression rate of the image data compressing means in dependence on the available bus bandwidth.

In order to achieve the object defined above, with a computer program product according to the invention characteristic features are provided so that a computer program product according to the invention is directly loadable into the memory of a computer device and comprising software code portions for performing the steps of a method according to the invention when said product is run on the computer device.

In order to achieve the object defined above, a computer device according to the invention comprises a central processing unit and a memory and processes the computer program product according to the above paragraph.

The characteristic features according to the invention provide the advantage that congesting the data bus can be avoided by a graceful degradation of quality of digital pictures.

When interfacing the computing sub-system to the image data compressing means via an imaging sub-system being connected with the data bus the imaging sub-system can relieve the computing sub-system of various tasks related to the digital picture processing, thereby also reducing the data load on the data bus. One of said tasks that can with particular advantage be carried out by the imaging sub-system is to control the display in order to show previews of the pictures taken by means of the camera on the display.

In a preferred embodiment of the invention the imaging sub-system comprises a first-in-first-out (FIFO) buffer for buffering the compressed picture data stream enabling to decouple generating the compressed picture data stream from transmitting it to the computing sub-system, thereby enabling asynchronous access of the computing sub-system to the data of the compressed picture data stream temporarily stored in the FIFO buffer.

Of course, any data buffer and hence also the FIFO buffer according to the present invention will overflow, if it is not emptied quickly enough. In order to cope with problems that might arise in relation to an overflow of the FIFO buffer it is suggested to monitor buffer overflows and, if necessary, to send an overflow warning signal to the imaging control means which in turn will instruct the image data compressing means to increase the compression rate of the compressed picture data stream and thereby to slow down further filling of the FIFO buffer until the buffered data are emptied again with a sufficient rate.

The present invention is with particular advantage applicable in mobile phones which have to execute numerous time critical program applications. The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

FIG. 1 shows a block circuit diagram of a computer device according to the invention.

DESCRIPTION OF PREFERRED EMBODIMENTS

An embodiment of the present invention is now explained with reference to FIG. 1 depicting a computer device 1 which is configured as a mobile phone (sometimes also called cellular or cell phone). Alternatively, the computer device 1 could be configured as a personal digital assistant, referred to as PDA, or the like. The computer device 1 is adapted to execute multiple time critical computer program applications in parallel, wherein one of said program applications is a digital picture taking application, other ones comprise a cellular telecom stack, a user interface and the like.

The computer device 1 comprises a camera 2 having an optical system 3, i.e. one or more lenses and means for controlling the lenses, at least one electronic image sensor 4, e.g. being configured as a CCD image sensor or CMOS image sensor, providing raw image data (a matrix of pixels) from the optical information received from the optical system 3 and image data compressing means 5 being adapted to compress the raw image data provided by the electronic image sensor 4 into a compressed picture data stream CPS, like a JPEG stream.

The image data compressing means 5 are configured to generate the compressed picture data stream CPS with a variable and externally controllable compression rate.

The computer system 1 also comprises a display 6 for showing previews and views of pictures taken by means of the camera and pictures that have previously been taken and are stored in the computer device 1.

Further, the computer device 1 comprises a computing sub-system 7 for executing computer program applications in parallel. Said computing sub-system 7 comprises a central processing unit CPU, a random access memory RAM and at least one non-volatile memory 8, like an EPROM, and EEPROM and/or a FLASH memory.

A data bus 9 connects the computing sub-system 7 with the image data compressing means 5 via an imaging sub-system 10 which will be explained in detail below.

According to the invention the computer device 1 further comprises a CPU and bus bandwidth manager 11 and imaging control means 12, wherein in this embodiment both of them are realized as program services running in the CPU of the computing sub-system 7. The CPU and bus bandwidth manager 11 monitors the available CPU utilisation and bandwidth on the data bus 9 in dependence on the activities of the computer program applications and allocates bus bandwidth to active computer program applications. Thus, the CPU and bus bandwidth manager 11 instructs the imaging control means 12 about the available bandwidth which in turn compute the data rate of the compressed picture data stream CPS that can be transmitted via the data bus 9 according to the prevailing bandwidth conditions and instruct the image data compressing means 5 to adapt the compression rate for further generating the compressed picture data CPS stream accordingly. In order to illustrate this controlling process a control line 13 is drawn in FIG. 1 from the imaging control means 12 to the image data compressing means 5, but it should be observed that controlling can also be achieved by transmitting respective control instructions from the imaging control means 12 to the image data compressing means 5 via the data bus 9. It should further be observed that adapting the compression rate of the compressed picture data stream CPS by means of the imaging control means 12 is a continuous process. Therefore the imaging control means 12 is configured as a software closed control loop with the available bandwidth functioning as control variable, wherein—depending on the evolution on the system activities, the CPU and bus bandwidth manager 11 will update the imaging control means about the bus bandwidth that can be used.

The imaging sub-system 10 is configured with a first-in-first-out (FIFO) buffer 14 for buffering the compressed picture data stream CPS. The data stored in the FIFO buffer 14 are read out from the computing sub-system 7 via the data bus 9 during image acquisition. Under most operating circumstances the image acquisition will be completed successfully. There are, however, situations in which the FIFO buffer 14 can overflow during image data acquisition. Such situations have to be handled by the control loop of the imaging control means 12. Now examples for situations resulting in FIFO buffer overflow and how the invention copes with the same are given:

At switch-on of the computer device 1, the picture taking application including the imaging control means 12 will register to the CPU and bus bandwidth manager 11. The CPU and bus bandwidth manager 11 will indicate to imaging control means 12 the bus bandwidth that can be used by the picture taking application, e.g. a bandwidth of 6 MBytes/s based on the fact that at the moment the picture taking application is the only active program application. Based on this bandwidth information and given that 15 images (also called frames) per second are to be transmitted from the image data compressing means 5 to the computing sub-system 7, the imaging control means 12 calculate a maximum target image file size of 400 kBytes (=6 MBytes/15 fps) and instruct the image data compressing means 5 to deliver a compressed picture data stream CPS that does not exceed 400 kBytes per picture (frame). Under these prerequisites a first cause for a FIFO buffer overflow is given when the image data compressing means 5 have sent picture data streams CPS to the imaging sub-system 10 that exceed the calculated maximum target image file size. For instance, the sent picture data stream CPS amounts to 460 kBytes per frame with 15 fps. In this case, the CPU of the computing sub-system 7 has no time to read what has been written by the image data compressing means 5 via the imaging sub-system 10 into the FIFO buffer 14 (e.g. the size of the FIFO buffer 14 is 8 kBytes). When the imaging sub-system cannot write any longer data being transmitted by the image data control means 5 into its FIFO buffer 14, since it is full, the imaging sub-system generates a FIFO overflow warning signal OF toward the computing sub-system 7.

A second reason for a FIFO buffer overflow is given when the image data compressing means 5 send a compressed picture data stream CPS within the allowed bandwidth, e.g. with an image file size of 350 kBytes per frame, 15 fps, but suddenly other program applications become active, like the cellular telecom stack, so that there is GSM/GPRS telecom activity in parallel, e.g. using 25% CPU performance and 25% bus bandwidth, thereby now allowing only a compressed picture data stream CPS of maximum 300 kBytes per frame with 15 fps. In this case, the CPU of the computing sub-system 7 has no time either to read what has been written by the imaging sub-system 10 into the FIFO buffer 14. As soon as the FIFO buffer 14 is full, the imaging sub-system generates a FIFO overflow warning signal OF toward the computing sub-system 7.

In both cases, the imaging control means 12 respond to the overflow warning signal OF by instructing the image data compressing means 5 to increase the compression rate of the compressed picture data stream CPS, or in other words to reduce the image file size to lower values, or even to a minimum value. Hence, although the FIFO buffer overflow results in an errored picture acquisition, with the software control loop incorporated in the imaging control means 12 the situation will be calmed with just a short delay for acquiring new pictures that is acceptable for end-users (e.g. new picture acquisition=2 frames=2*66 ms). Further, also the CPU and bandwidth manager 11 will react to the activation of the second program application and will reduce the bus bandwidth that can be allocated to the picture taking application, so that for further picture snapshots, the imaging control means 12 will use the bus bandwidth information to define a lower maximum file size of the image files, so that the described FIFO buffer overflows will only occur under extraordinary transitional conditions.

It should be noted that in a preferred embodiment the image data compressing means 5 comprise a JPEG encoder that can be configured with a target JPEG file size.

It should also be noted that there are control channels between the CPU and the imaging sub-system 10 and between the CPU and the display LCD 6 to configure the the imaging sub-system 10 and the display. However, since these control channels are no essential features of the invention they have been omitted from the drawings for the sake of clarity.

Further, it should be observed that the imaging sub-system 10 is in charge of interfacing the computing sub-system 7 with the camera 2 and the display 6, with the following functions:

For preview of an image, the image is sent from the camera 2 to the display 6 through the imaging sub-system 10.

For acquisition of an image, the image is sent from the camera 2 to the computing sub-system 7 through the imaging sub-system 10.

For displaying of a previously acquired image, this image is sent from the computing sub-system 7 to the display 6 through the imaging sub-system 10.

It should also be observed that the imaging control means 12 are in charge of supplying services and controlling imaging resources (imaging sub-system 10, camera 2, display 6). Particularly, the imaging control means 12:

Configure the display 6.

Configure the camera 2.

Configure the imaging sub-system 10.

Register to the CPU and bus bandwidth manager 11 to get the information about bus bandwidth that can be used.

Implement the software control loop to reduce target image file size during acquisition if a FIFO buffer overflow occurs.

Set Preview Mode (image sent from the camera 2 to display 6 via the imaging sub-system 10).

Make image acquisition (image sent as a compressed picture data stream CPS from the camera 2 to the computing sub-system 7 via the imaging sub-system 10) .

Display a picture (image decoded by the imaging control means 12 from the compressed picture data stream to pixel format and sent from the computing sub-system 7 to the display 6 via the imaging sub-system 10).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer device for executing multiple computer program applications in parallel, wherein one of said program applications is a digital picture taking application, the computer device comprising:
   a camera comprising an optical system, at least one electronic image sensor providing raw image data from the optical information received from the optical system and an image data compressor for compressing the raw image data provided by the electronic image sensor into a compressed picture data stream (CPS), the image data compressor being operative to generate the CPS with a variable and externally controllable compression rate;
   a display for displaying pictures taken with the camera;
   an imaging subsystem configured to perform digital imaging processing tasks and comprising a first-in-first-out (FIFO) buffer for buffering the CPS;
   a computing subsystem for executing the computer program applications, the computing subsystem comprising a central processing unit (CPU), a random access memory and at least one non-volatile memory;
   a data bus interfacing the computing subsystem with the imaging subsystem;
   a bus bandwidth manager for monitoring available CPU utilization and bus bandwidth in dependence on activities of the computer program applications and for allocating bus bandwidth to active computer program applications; and
   an imaging control means for controlling a compression rate of the image data compressor depending on available bus bandwidth;
   wherein the imaging subsystem is operative to send an overflow warning signal to the imaging control means on a direct control line and the imaging control means is operative to instruct the image data compressor on another direct control line to increase the compression rate of the CPS.

2. A computer device as claimed in claim 1, wherein the imaging subsystem is operative to show previews of pictures taken by means of the display.

3. A computer device according to claim 1, wherein the computer device is configured as a mobile phone.

4. The computer device of claim 1 in which the image control means is realized as a program service running in the CPU of the computing subsystem.

5. The computer device of claim 1 in which the bandwidth manager is realized as a program service running in the CPU of the computing subsystem.

6. A computer device according to claim 2, wherein the computer device is configured as a mobile phone.

7. A method for controlling a digital picture taking application in a computer device operative to execute multiple computer program applications in parallel, wherein one of said program applications is the digital picture taking application, the computer device comprising (1) a camera with an optical system, at least one electronic image sensor providing raw image data from the optical information received by the optical system and an image data compressor for compressing, with a variable and externally controlled compression rate, raw image data provided by the electronic image sensor into a compressed picture data stream (CPS), (2) a computing subsystem for executing the computer program applications and comprising a central processing unit (CPU), a random access memory and at least one non-volatile memory, (3) an imaging subsystem configured to perform digital imaging processing tasks and comprising a first-in-first-out (FIFO) buffer for buffering the CPS, (4) an imaging control means, (5) a bus bandwidth manager, and (6) a data bus interfacing the computing subsystem with the imaging subsystem, and wherein the imaging subsystem comprises a first-in-first-out (FIFO) buffer for buffering the CPS, the method comprising:
   monitoring, by the bus bandwidth manager, available CPU utilization and bus bandwidth in dependence on the activities of the computer program applications;
   allocating, by the bus bandwidth manager, bus bandwidth to active computer program applications;
   controlling, by the imaging control means, the compression rate of the image data compressor based on available bus bandwidth; and
   monitoring by the imaging control means for the occurrence of a warning signal sent by the imaging subsystem on a direct control line of an overflow of the FIFO buffer and, if such a warning signal is received, transmitting by the imaging control means to the image data compressor on another direct control line instructions to increase the compression rate of the CPS.

8. A method as claimed in claim 7, wherein previews of the pictures taken by means of the camera are sent to the display by means of the imaging subsystem.

9. A computer program product stored on a non-transitory computer-readable medium directly loadable into the memory of a computer device, comprising software code portions for performing the steps of a the method according to claim 7 when said product is run on the computer device.

10. A computer device with a central processing unit and a memory, wherein the computer device is adapted to process the computer program product as claimed in claim 9.

* * * * *